United States Patent Office 3,113,787
Patented Dec. 10, 1963

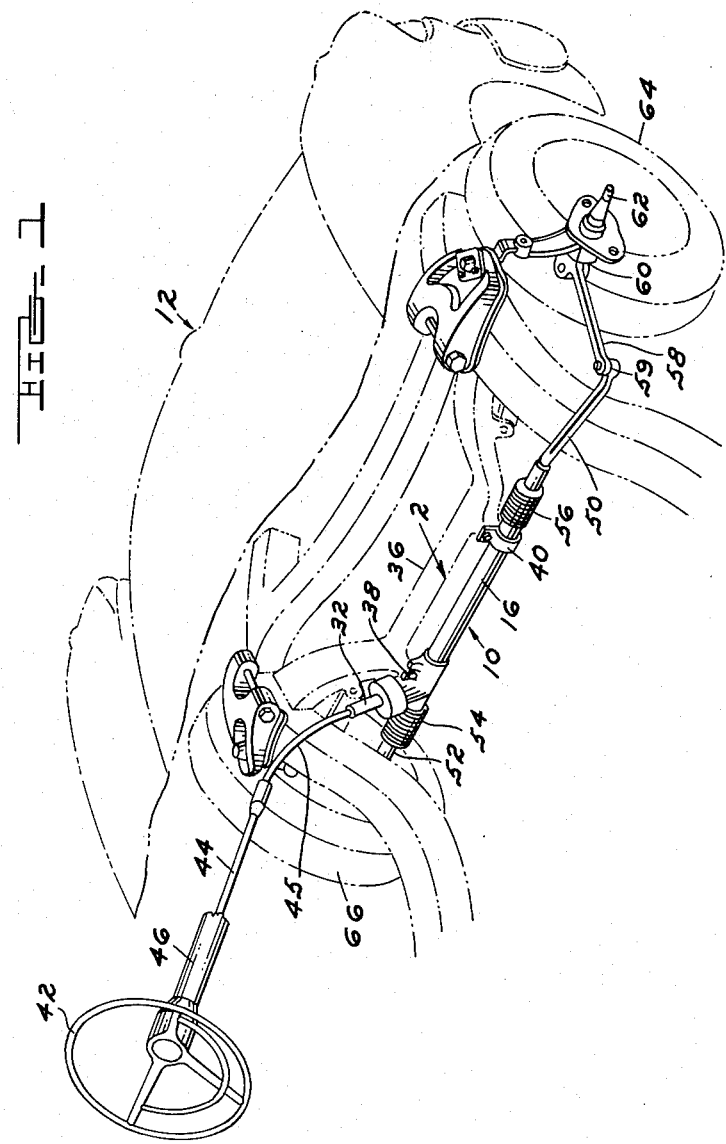

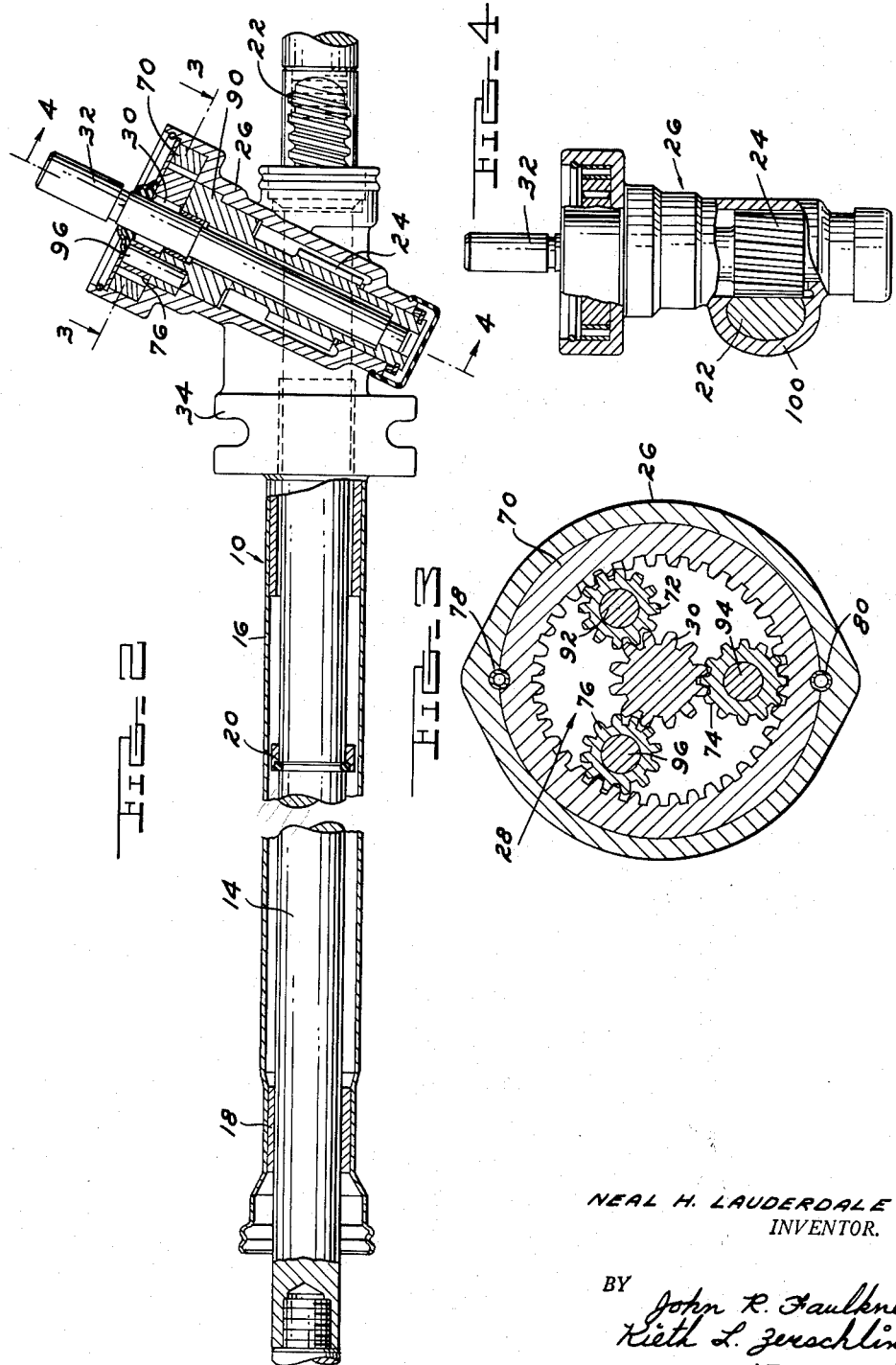

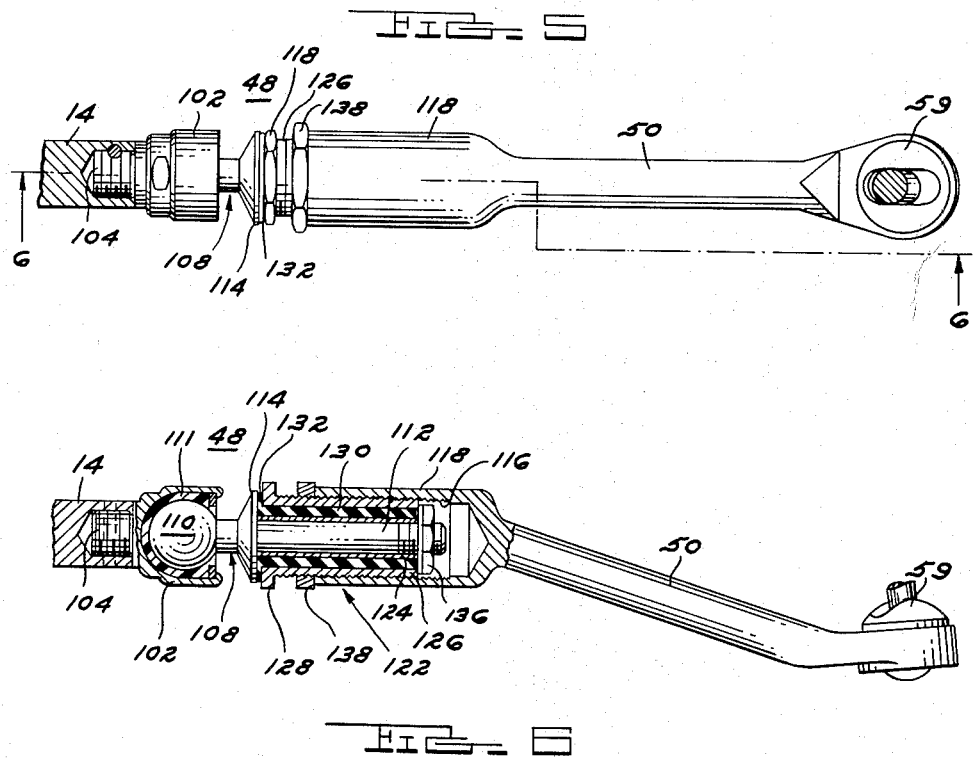

3,113,787
STEERING LINKAGE
Neal H. Lauderdale, Birmingham, Mich., assignor to Ford Motor Company, Dearborn, Mich., a corporation of Delaware
Filed May 16, 1961, Ser. No. 110,410
5 Claims. (Cl. 280—95)

This invention relates to a steering linkage for an automotive vehicle and more particularly to a steering linkage for an automotive vehicle that provides compliance for loads applied to the front of the steerable road wheels of the vehicle.

Although not so limited, the invention is particularly adapted to be employed with a rack and pinion steering gear. In this type of gear a tie rod connects one end of the rack to one of the steerable road wheels of the vehicle while another tie rod connects the other end of the rack to the other steerable road wheel of the vehicle. Such a system is inherently a relatively rigid system so that a large amount of feedback is received from the steerable wheels at the steering wheel due to the steerable wheels striking various obstacles in a roadway.

This invention provides means that interconnect the ends of the rack with the tie rods for providing compliance in the linkage that will absorb the loads applied to the front of the steerable road wheels. These forces will tend to cause the wheels to toe outwardly. The system is so designed that it provides no compliance for forces applied to the rear of the steerable road wheels. The advantage of this type of arrangement is that for a given amount of play in the system, all of it can be employed to absorb the forces applied to the front of the steerable road wheels. These will be the only forces that will be of consequence in causing the driver of the vehicle to feel road shocks and feedback at the steering wheel under ordinary operating conditions. In previous systems known to the applicant, the compliance has been provided in both directions thereby limiting the amount that the steering linkage can yield due to the loads applied to the front of the wheels to one-half of the play in the system.

In the preferred embodiment of the invention, the applicant accomplishes this compliance by providing a resilient bushing assembly positioned between the ends of the rack and the tie rods. This resilient bushing assembly is preferably threadingly received in a bore in the end of the tie rod and is connected to the ends of the rack by a ball joint. By means of this construction the applicant can adjust the toe-in of the wheels by rotating the outer sleeve of this resilient bushing. Thus the applicant provides both a means for furnishing unidirectional compliance and means for providing toe adjustment in a single structure.

An object of the invention is the provision of a steering linkage for an automotive vehicle in which compliance is provided only for forces applied to the front of the steerable road wheels of the vehicle.

Another object of the invention is the provision of a steering linkage for an automotive vehicle in which a single means is employed for both providing unidirectional compliance in the linkage system and for providing a toe adjustment.

Other objects and attendant advantages of the invention will become more fully apparent when the specification is considered in connection with the attached drawings in which:

FIGURE 1 is a view showing a preferred embodiment of the steering linkage of the present invention mounted in an automotive vehicle;

FIGURE 2 is a longitudinal sectional view partially in elevation of the rack and pinion steering gear of the present invention, taken in the direction of the arrow shown on FIGURE 1;

FIGURE 3 is a cross sectional view taken along the lines 3—3 of FIGURE 2;

FIGURE 4 is a sectional view partially in elevation taken along the lines 4—4 of FIGURE 2;

FIGURE 5 is a plan view showing a portion of the rack, a tie rod, and the compliant connection between the rack and the tie rod, and FIGURE 6 is a sectional view partially in elevation taken along the lines 6—6 of FIGURE 5.

Referring now to the drawings in which like reference numerals designate like parts throughout the several views thereof, there is shown in FIGURE 1 the preferred steering mechanism of the present invention, generally designated by the numeral 10. This steering mechanism is positioned in the motor vehicle shown in phantom form and generally designated by the numeral 12. As can best be seen by reference to FIGURE 2 this steering mechanism 10 includes a rack 14 slidably positioned within the housing 16 by means of bearings located adjacent either end of the rack, one of which is shown at 18. The rack 14 includes a toothed portion 22 at one end thereof for engagement with a pinion gear 24 that is positioned within a reduction gear housing 26. The rack also has a stop member 20 affixed thereto by means of a snap ring. The reduction gear housing 26 carries a planetary reduction gear train, generally designated by the numeral 28, and this gear train includes a sun gear 30 affixed or formed integrally with an input shaft 32.

The reduction gear housing 26 includes a portion 34 that receives the rack housing 16, and this portion of the housing is affixed to a frame cross member 36 of the automotive vehicle by means of bolts, one of which is shown at 38. The rack housing 16 is also affixed to this cross member by means of a bracket 40.

The input shaft 32 to the planetary gear train 28 is connected to a steering wheel 42 through any suitable means, preferably a steering wheel shaft 44 and a flexible cable 45. The flexible cable may be connected to the steering wheel shaft and to the input shaft 32 by means of swaging. The steering wheel shaft 44 may be suitably mounted in a steering column tube 46 that may in turn be suitably affixed to the vehicle by any suitable conventional means (not shown).

The rack 14 includes a threaded bore at each end thereof. Each of these bores receives the housing of a ball joint assembly, one of which is shown at 48 in FIGURES 5 and 6. As will be explained more fully at a later point in the specification, these ball joint assemblies connect the rack 14 with a pair of steering links or tie rods 50 and 52 through resilient bushing assemblies. The ball joints and the resilient bushing assemblies are covered by a pair of suitable flexible boots 54 and 56. The tie rod or steering link 50 is connected to a knuckle arm 58 by means of a suitable connection 59. The knuckle arm is in turn connected to steering knuckle 60. The steering knuckle 60 includes a spindle 62 which rotatably supports a dirigible or steerable road wheel 64 of the vehicle. The motor vehicle also includes a second dirigible or steerable wheel 66 that is connected to steering link or tie rod 52 through another knuckle arm, steering knuckle and spindle (not shown).

The planetary reduction gear set 28 may take any suitable form, for example, it includes the sun gear 30 affixed to the input shaft, a ring gear 70 positioned within the reduction gear housing 26, and a plurality of planet gears, designated by the numerals 72, 74 and 76. The ring gear is restrained from rotation within the housing 26 by a pair of pins 78 and 80. The planet gears 72, 74 and 76 are rotatably positioned upon a planet carrier 90 by means of pins 92, 94 and 96. The planet carrier 90 may be integrally formed with the pinion 24.

The toothed portion 22 of the rack 14 is received in a sliding fit relationship in a protuberance 100 in the housing 26 and, therefore, is forced into engagement with the pinion 24.

Referring now to FIGURES 5 and 6, there is shown the means for furnishing unidirectional compliance in the steering linkage and the means for providing toe adjustment for the road wheels. This means is shown connecting the rack 14 with one of the steering links or tie rods 50 and it is to be understood that the other steering link or tie rod 52 is connected through the same type of means to the other end of the rack. This means includes the ball joint 48 having a housing 102 that is provided with a threaded shank 104. This threaded shank is fastened in the threaded bore in the rack 14. The ball portion 108 of the ball joint 48 includes a ball proper 110 positioned within liner 111 in the housing 102 and a stud 112 having a radially outwardly extending flange 114.

The steering link or tie rod 50 has an internally threaded bore 116 positioned in enlarged end portion 118 that faces the end of the rack 14.

A resilient bushing assembly 122 is employed to connect the ball joint with the tie rod or steering link. This resilient bushing assembly includes an inner metallic sleeve 124, an outer metallic sleeve 126 that is threaded along its outer periphery and has a radially extending flange 128 at one end thereof. A resilient member 130 composed of a suitable elastomer, for example synthetic rubber, is positioned between the inner and outer sleeves and is preferably bonded to each of the sleeves. It also includes a radially extending flange 132.

The resilient bushing assembly 122 is connected to the ball portion 108 of the ball joint. This is accomplished by positioning the stud 112 within the inner sleeve 124. The stud 112 has a threaded end portion for receiving a nut and washer assembly 136. The washer bears both on the outer sleeve 126 and on the inner sleeve 124, and when the nut is tightened it can be appreciated that the flange 132 of the resilient member 130 is compressed between the flange 128 of the outer sleeve and the flange 114 of the ball portion 108. A pre-load of approximately 200 lbs. may be placed upon the flange 132 in conventional size vehicles. The outer sleeve 126 is then threaded into the internal bore 116 in the tie rod 52. This can be readily accomplished since the ball 110 is capable of rotating within the housing liner 111. It can readily be appreciated that the length of the steering linkage shown in FIGURES 5 and 6 can be adjusted by rotating the outer sleeve of the resilient bushing thereby providing a toe adjustment for the steerable road wheels of the vehicle, and for this purpose the flange 128 may be formed into a hexagonal shape for receiving an adjusting wrench. A lock nut 138 is employed to secure the bushing assembly relative to the steering link or tie rod when this adjustment is completed.

The structure shown in FIGURES 5 and 6 provides compliance when this steering linkage is subjected to compressive forces. These compressive forces would be created, as can be appreciated from an inspection of FIGURE 1, by forces applied to the front of the steerable road wheels 64 and 66. These forces are encountered during normal driving operations and tend to move the steerable wheels rearwardly of the vehicle and because of the restraint imposed by the suspension system tend to cause the wheels to toe outwardly. These forces are transmitted to the tie rod or steering link 50 through the spindle 62, steering knuckle 60, the knuckle arm 58 and the connection 59. When these forces attempt to move the end of the tie rod or steering link 50 toward the rack 14, the forces are yieldingly resisted by the resilient bushing assembly including the flange 132 of the resilient member 130.

The steering link shown in FIGURE 6 provides no compliance when tensile forces are applied to it. This type of force would occur if the steerable road wheels were to encounter a force tending to move them forwardly of the vehicle and tending to cause the wheels to toe inwardly. This rarely occurs in normal driving operations. In this case the force is transmitted directly to the rack 14 through the tie rod or steering link 50, the outer sleeve 126 of the resilient bushing assembly, the washer and nut assembly 136, the ball portion 108 and the housing 102 of the ball joint assembly 48.

The steering linkage as described will, therefore, furnish compliance in one direction only and has advantages over conventional steering systems which afford compliance in both directions since the amount of play that can safely be inserted in the steering linkage may be used to absorb forces applied to the front of the road wheels only. As pointed out above, the steerable road wheels rarely encounter forces applied to the rear of the steerable road wheels. Thus with a given amount of play for a steering system, twice as much effective compliance can be provided with the system of the present invention.

The present invention thus provides, in a steering linkage, means for furnishing unidirectional compliance and means for providing toe adjustment in a single structure. Although the invention has been illustrated and described in connection with a rack and pinion steering gear it may be equally well employed with other conventional types of steering gears.

It will be understood that the invention is not to be limited to the exact construction shown and described, but that various changes and modifications may be made without departing from the spirit and scope of the invention as defined in the appended claims.

I claim:

1. In an automotive vehicle, a steering gear, a steerable road wheel, steering linkage interconnecting said steering gear with said steerable road wheel, said steering linkage including a tie rod and a member actuated by said steering gear, said tie rod having an internally threaded end portion, a resilient bushing assembly having an externally threaded outer sleeve received within said internally threaded end portion of said tie rod, said resilient bushing assembly having an inner sleeve and an intermediate member constructed of an elastomer, a ball joint affixed to said member actuated by said steering gear and means interconnecting said resilient bushing assembly and said ball joint for providing compliance when the steering linkage is subjected to compressive loads and for providing a rigid connection when said steering linkage is subjected to tensile loads.

2. In an automotive vehicle, a steering gear, a member actuated by said steering gear, a steerable road wheel, a tie rod connected to said steerable road wheel, said tie rod having a threaded bore in one end thereof facing one end of said member, a resilient bushing assembly having an outer threaded sleeve threaded into the bore in said tie rod, said resilient rubber bushing assembly including an inner sleeve, and a resilient member constructed of an elastomer, said outer sleeve and said resilient member each having a radially extending flange, with the flange of said inner sleeve being positioned on one side of the flange of said resilient member, means extending from said member through said inner sleeve, said means having a radially extending flange positioned on the other side of the radially extending flange of said resilient member, fastening means engaging said inner and outer sleeves of said resilient bushing assembly and the means extending from the member through said inner sleeve, said means placing a compressive preload on the radially extending flange of said resilient member whereby compliance is effected for compressive loads applied to said tie rod, said outer sleeve having means positioned thereon for permitting rotation of the outer sleeve relative to the tie rod whereby toe adjustment of said steerable road wheels may be effected.

3. In an automotive vehicle, a steering gear, a steerable road wheel, steering linkage interconnecting said steering gear with said steerable road wheel, said steering linkage including a tie rod and a member actuated by said steering gear, said tie rod having a threaded end portion, a resilient bushing assembly having a threaded sleeve received by said threaded end portion of said tie rod, said resilient bushing assembly having an inner member and an intermediate member constructed of an elastomer and located about said inner member, said intermediate elastomer member retained in said threaded sleeve, a ball joint having a portion affixed to said member actuated by said steering gear and means interconnecting said resilient bushing assembly and said ball joint for providing compliance when said steering linkage is subjected to compressive loads and for providing a rigid connection when said steering linkage is subjected to tensile loads.

4. In an automotive vehicle, a steering gear, a steerable road wheel, steering linkage interconnecting said steering gear with said steerable road wheel, said steering linkage including a tie rod and a member actuated by said steering gear, said tie rod having an end portion, a resilient bushing assembly having a sleeve received and retained by said end portion of said tie rod, said resilient bushing assembly having an intermediate member constructed of an elastomer, said intermediate elastomer member retained in said sleeve, a ball joint connected to said member actuated by said steering gear and means interconnecting said resilient bushing assembly and said ball joint for providing compliance when said steering linkage is subjected to compressive loads and for providing a rigid connection when said steering linkage is subjected to tensile loads.

5. In an automotive vehicle, a steering gear, a steerable road wheel, steering linkage interconnecting said steering gear with said steerable road wheel, said steering linkage including a tie rod and a member actuated by said steering gear, said tie rod having an end portion, a resilient bushing assembly having a sleeve received and retained by said end portion of said tie rod, said resilient bushing assembly having an inner member and an intermediate member constructed of an elastomer, said intermediate elastomer member retained in said sleeve, a ball joint connected to said member actuated by said steering gear and means interconnecting said resilient bushing assembly and said ball joint for providing compliance when said steering linkage is subjected to compressive loads and for providing a rigid connection when said steering linkage is subjected to tensile loads.

References Cited in the file of this patent

UNITED STATES PATENTS

| | | |
|---|---|---|
| 1,551,711 | Toaz | Sept. 1, 1925 |
| 2,175,429 | Chayne | Oct. 10, 1939 |
| 2,227,521 | Utz | Jan. 7, 1941 |
| 2,305,880 | Leighton | Dec. 22, 1942 |
| 2,828,969 | Hoffman | Apr. 1, 1958 |
| 2,955,667 | Cota | Oct. 11, 1960 |

FOREIGN PATENTS

| | | |
|---|---|---|
| 1,134,559 | France | Dec. 3, 1956 |
| 553,860 | Italy | Aug. 3, 1957 |
| 146,740 | Switzerland | July 16, 1931 |